(12) United States Patent     (10) Patent No.:   US 12,566,937 B2

Kvitsiani          (45) Date of Patent:     Mar. 3, 2026

(54) WEARABLE DEVICE FOR DATA STORAGE AND EXCHANGE

(71) Applicant: Davit Kvitsiani, Tbilisi (GE)

(72) Inventor: Davit Kvitsiani, Tbilisi (GE)

( * ) Notice: Subject to any disclaimer, the term of this patent is extended or adjusted under 35 U.S.C. 154(b) by 45 days.

(21) Appl. No.: 18/600,753

(22) Filed: Mar. 10, 2024

(65) Prior Publication Data

US 2024/0303460 A1     Sep. 12, 2024

Related U.S. Application Data

(60) Provisional application No. 63/451,254, filed on Mar. 10, 2023.

(51) Int. Cl.
*G06K 19/077*       (2006.01)

(52) U.S. Cl.
CPC ... *G06K 19/07762* (2013.01); *G06K 19/0779* (2013.01)

(58) Field of Classification Search
None
See application file for complete search history.

(56) References Cited

U.S. PATENT DOCUMENTS

2018/0248586 A1*   8/2018   Pachler ................... H04B 5/26

FOREIGN PATENT DOCUMENTS

CN      214278976 U   *   9/2021

* cited by examiner

*Primary Examiner* — Kristy A Haupt

(74) *Attorney, Agent, or Firm* — White-Welker & Welker, LLC; Matthew T. Welker, Esq.

(57) ABSTRACT

Wearable ring using near field communications (NFC) to store, receive, and transmit information. A ring can be made from silver or gold materials, the ring band having a first unfinished section with a recess for retaining an NFC chip and antenna and a cut or broken section creating a thin vertical line inside the ring from which a signal can escape. The antenna is a copper wire wrapped around the ring, in the recess of the unfinished band, before being covered with a second layer of metal having a non-metallic section covering the cut or broken section allowing the NFC signal to escape from the inner confines/recess of the ring. The antenna is turned around the ring and soldered to a near field communications (NFC) chip. The ring uses the power from the NFC chip, which communicates via magnetic induction providing a reading distance up to 5 cm.

5 Claims, 8 Drawing Sheets

<u>100</u>

100

105

106

101

100

105

101

106

100

100

112

WEARABLE DEVICE FOR DATA STORAGE AND EXCHANGE

FEDERALLY SPONSORED RESEARCH

Not Applicable

SEQUENCE LISTING OR PROGRAM

Not Applicable

TECHNICAL FIELD OF THE INVENTION

The present invention relates generally to a wearable device for storing and transmitting data. More specifically, the present invention relates to a wearable ring using near field communications (NFC) to store, receive, and transmit information.

BACKGROUND OF THE INVENTION

Wearable devices for payments and keys are becoming more common in the current marketplace as smart devices such as watches, and fitness trackers have gained popularity. Most smart watches and phones use wireless communication protocols designed for prolonged connections with other devices like computers, headsets, keyboards, and other mobile phones. Fast data speeds and an acceptable range are necessary for the operation of these devices.

Conversely, near field communication (NFC) is not really meant for continuous data transfer. Instead, it is meant for short bursts of data to read tags, making it ideal for payment transactions or use as a key for locking or unlocking access to devices or locations such as cars and houses.

Therefore, what is needed is a wearable device that can function as a payment system and/or a key, which can be combined with jewelry, such as a ring, making it much less intrusive and reducing the number of items a person needs to carry or wear.

SUMMARY OF THE INVENTION

The present invention is a wearable ring using near field communications (NFC) to store, receive, and transmit information. In one embodiment of the present invention, a basic wearable device of the present invention is taught, where the wearable device is in the shape of a ring intended to be worn on a finger.

In this exemplary embodiment the ring can be made from silver, gold, platinum, or palladium materials, or any combination thereof. The ring band is comprised of a first unfinished section having a recess for retaining an NFC chip and antenna and a cut or broken section. This cut creates a thin vertical line inside the ring from which a signal can more easily escape from the NFC chip and antenna retained withing the band recess.

An antenna is comprised of a copper wire wrapped around the ring, in the recess of the unfinished band, before being covered with a second layer of metal having a non-metallic section covering the cut or broken section allowing the NFC signal to escape from the inner confines/recess of the ring, where the antenna and NFC chip are located.

The antenna constructed from copper wire is turned around the ring and soldered to a near field communications (NFC) chip. The wearable device uses the power from the NFC chip, which communicates via magnetic induction providing a reading distance up to 5 cm. The NFC chip receives energy from the reader, for example from a POS terminal when making payment or from a mobile phone when writing data in the NFC chip using the mobile device.

The NFC chip and the copper wire antenna is further comprised of one or more capacitors for tuning the antenna and for achieving the best reading performance when transmitting, receiving, and/or exchanging data between the NFC chip and a receiver, transmitter, or transceiver.

The solution and device taught by the present invention only uses the passive NFC technology, that receives energy from the reader using electromagnetic induction, so the wearable device of the present invention doesn't have any batteries or power requirements, and while providing a robust signal ensuring desired functionality.

BRIEF DESCRIPTION OF THE DRAWINGS

The accompanying drawings, which are incorporated herein a form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized, and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Now referring to the Figures, the present invention is a wearable device, in an exemplary embodiment illustrated as a ring 100 using near field communications (NFC) to store, receive, and transmit information. Now referring to FIGS. 1 and 2, the basic wearable device of the present invention is taught where the wearable device is in the shape of a ring 100 intended to be worn on a finger.

Figure 1:
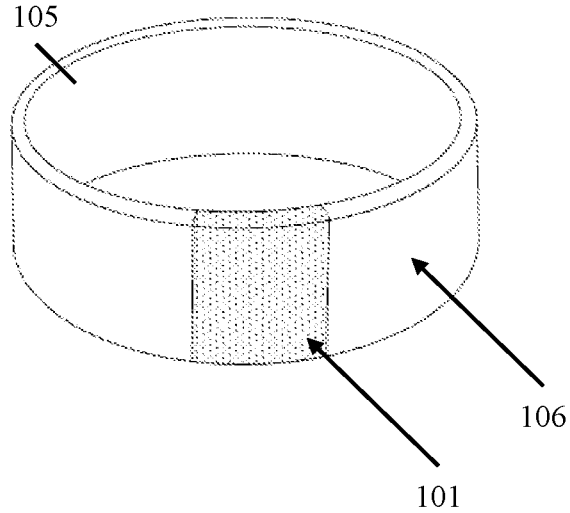
FIG. 1 illustrates the basic metal ring as taught by the present invention in one exemplary embodiment.

As shown in FIG. 1, the ring 100 can be made from silver, gold, platinum, or palladium materials, or any combination thereof.

Figure 7:
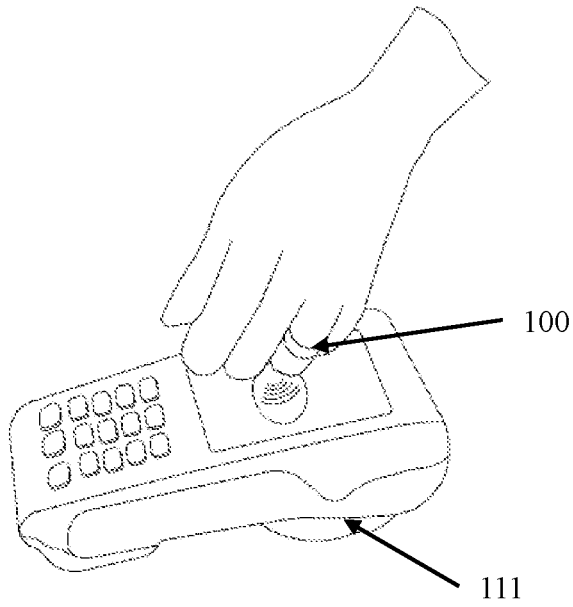
FIG. 7 illustrates how the present invention works in practice where a user is tapping their finger(s) and not the ring as the signal is transmitted from the circle of the ring to the POS device.

The ring 100 of the present invention functions as a contactless card or cards as illustrated in FIG. 7. The main features of the ring 100 are to provide contactless payments as illustrated in FIG. 7, other information exchanges, or act as house, car, or other keys.

Figure 2:
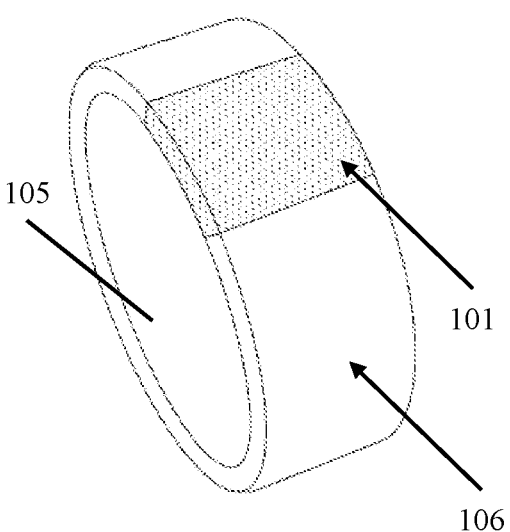
FIG. 2 is the basic metal ring having a copper wire turned around the ring acting as an antenna as taught by the present invention in one exemplary embodiment.
Figure 3:
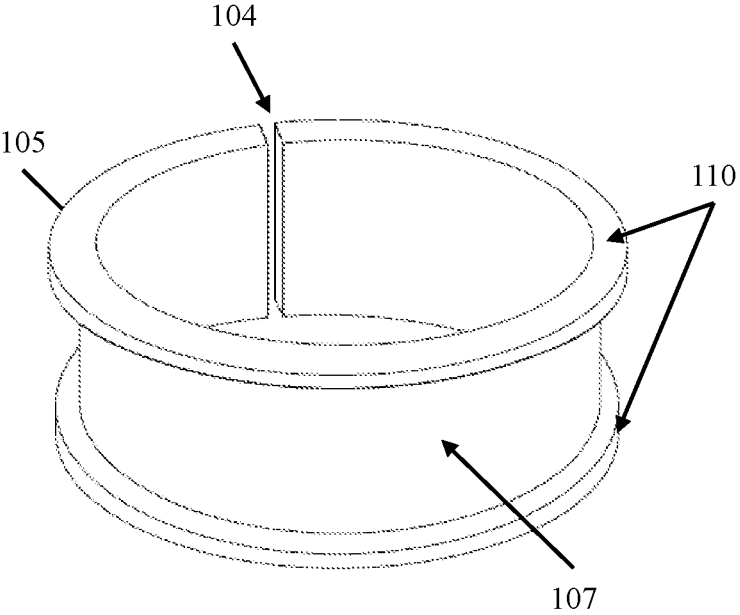
FIG. 3 illustrates an unfinished ring having a cut or broken section of the band as taught by the present invention in a second exemplary embodiment.
Figure 4:
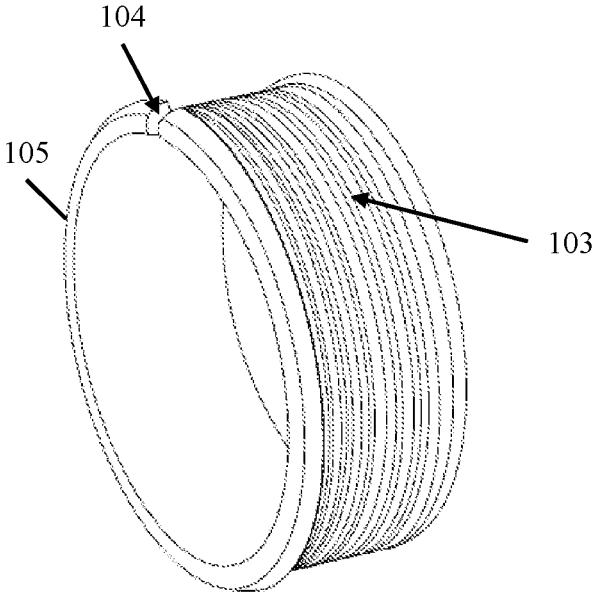
FIG. 4 illustrates the unfinished ring having a cut or broken section of the band as taught by the present invention in a second exemplary embodiment further having an antenna wrapped around the ring before being covered with a second layer of metal.

As shown in FIG. 2, the ring 100, in one exemplary embodiment, has a non-conductive section 101 and covering allowing the NFC signal 102 to escape from the inner confines of the ring 100, where an antenna 103 and NFC chip are located as shown in FIGS. 3 and 4.

As taught by the present invention, the NFC signal 102 is transmitted from the whole circle of the ring 100 not from the cut 104 or the non-conductive section 101 as denoted by the black portion on the outside of the ring band.

The cut 104 is made to split the unity of the metal circle of the first/inner ring body/band 105, as metals like silver, gold, platinum, or palladium materials, or any combination thereof are very conductive and act as a barrier for radio frequency (RF) signals. The passive NFC chip inside the silver, gold, platinum, or palladium materials, or any combination thereof relies on the antenna 103 to transmit and receive signals 102. When the metal ring is not cut, it is creating an enclosure around the antenna 103, which prevents the RF signal 102 from escaping or entering the ring 100.

By making a cut 104 on the circle of the ring an "open circuit" is created that allows the NFC signal 102 to propagate more effectively. When a metal ring 100 was intact or is comprised of a solid ring band/body 105, the intact or solid ring band/body 105 acts as a "closed circuit" that prevents the signal 102 from escaping or entering the ring 100. By creating a gap 104 in the ring 100, the Inventor has effectively created an "open circuit" that allows the NFC signal 102 to propagate more freely.

While the NFC chip, is a secure element, is small sized, and takes very little part of the ring 100, the antenna 103 is coiled around the inner ring body 105 making the closed circuit.

As the signal 102 is transmitted and the power is received using the antenna 103, it doesn't matter where the chip is located in the ring 100.

Covering an NFC antenna 103 embedded or attached to an inner ring body 105 or other jewelry with metal creates a problem, because the metal blocks the signal. Thus, currently there are no NFC rings fully made of metal available on the market.

FIG. 3 illustrates an unfinished ring 100 having a cut or broken section 104 of the band defined by the inner ring body 105 as taught by the present invention in a second exemplary embodiment. This cut 104 is a unique, novel, and non-obvious characteristic of the present invention, creating a thin vertical line inside the ring 100.

The thin vertical line or cut 104, as illustrated in one exemplary embodiment can be not only vertical, but diagonal or at any other angle across the inner ring body 105. The present invention teaches where the main results of the ring 100 is to ensure that there is a split or cut 104 in the circle of the inner metal ring body 105 and a non-conductive material is used as a joint 101, such as stone, glue or any non-conductive material.

FIG. 4 illustrates the unfinished ring 100 having a cut 104 or broken section of the inner ring band body 105 as taught by the present invention in a second exemplary embodiment further having an antenna 103 wrapped around the inner ring body 105 before being covered with a second layer of metal 106.

As shown in FIGS. 3 and 4, the ring 100 can be made from silver, gold, platinum, or palladium materials, or any combination thereof. The ring 100 band is comprised of a first unfinished section 105 having a recess 107 for retaining an NFC chip and antenna 103 and a cut 104 or broken section. This cut 104 creates a thin vertical line inside the ring 100 from which a signal 102 can more easily escape from the NFC chip and antenna 103 retained withing the band recess 107.

An antenna 103 is comprised of a copper wire wrapped around the ring 100, in the recess 107 of the unfinished band, before being covered with a second layer of metal 106 having a non-metallic section 101 covering the cut 104 or broken section allowing the NFC signal 102 to escape from the inner confines/recess 107 of the ring, where the antenna 103 and NFC chip are located. The outer part of the ring 106 also has cut 108, which is covered with stone or other non-conductive material 101 for aesthetics.

In practice, the Inventor has found that the signal 102 not only propagates through the cut 104 of the band, but the signal 102 is transmitting from the whole circle of the ring 100. The cut 104 is made to split the unity of metal circle of the inner ring body 105, since metals like silver, gold, platinum, or palladium materials, or any combination thereof are very conductive, they act as a barrier for radio frequency (RF) signals 102. The passive NFC chip inside the silver, gold, platinum, or palladium materials, or any combination thereof ring body 105 relies on the antenna 103 to transmit and receive signals 102. When the metal ring 100 is not cut, the continuous and solid metal ring body 105 creates an enclosure around the antenna 103, which prevents the RF signal 102 from escaping or entering the ring 100.

By making a cut 104 on the circle of the inner ring body 105, an "open circuit" is created that allows the NFC signal 102 to propagate more effectively. If/when the metal ring body 105 was intact, continuous, or solid, the metal ring body 105 acts as a "closed circuit" that prevents the signal 102 from escaping or entering the ring 100. By creating a cut 104 or gap in the inner ring body 105, an "open circuit" is effectively created that allows the NFC signal 102 to propagate more freely.

As shown in FIG. 4, an antenna 103 constructed from copper wire is turned around the inner ring body 105 and soldered to a near field communications (NFC) chip.

Figure 5:
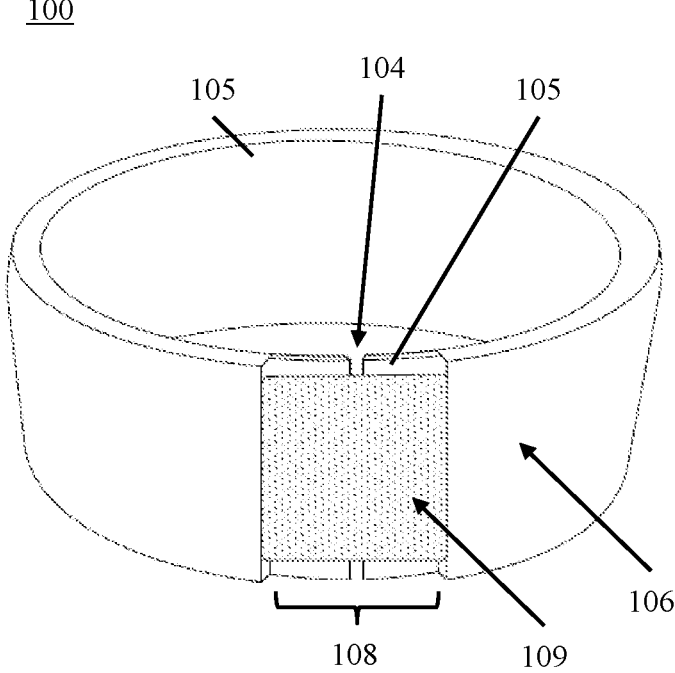
FIG. 5 illustrates the ring taught by the present invention covered with a second layer of metal, encapsulating the antenna and NFC chip before placing the stone, illustrating the cut of the outer part.

The antenna 103 can be made not only from copper wire, but also from silver wire and the antenna 103 can be a flexible printed circuit comprised of a flexible antenna 109 with an embedded chip and a capacitor as shown in FIG. 5, as well not only constructed from a manually tuned wire as shown in FIG. 4.

FIG. 5 illustrates the inner ring body 105 taught by the present invention covered with a second layer of metal 106, encapsulating the antenna and NFC chip 109 before placing the stone, illustrating the cut 108 of the outer second layer of metal 106.

Regarding the powering, both active and passive NFC devices need a power source, but in case of passive NFC devices the NFC chip receives power via electromagnetic induction. When an active NFC component comes near a passive component, the active component's electromagnetic field causes small currents to flow through the passive part. The generated power allows the passive NFC to send data whenever the active part is nearby.

In addition to the ring device taught by the present invention, the inventor has developed new methods for manufacturing of metal smart rings more efficient and reliable way.

In a preferred manufacturing process, the first part of the inner ring body 105 defining an inner exterior surface and an inner channel, space is created with a channel or recess 107 as shown in FIG. 3 and then the first part of the inner ring body 105 is covered with a top layer 106 created from a metal sheet formed to match the shape of the hollow inner space, channel or recess 107 of the first part 105 and these two parts of metals are soldered together for strong connection. The top layer 106 is soldered to the edges 110 of the first part 105 of the ring 100 in order the create/keep a hollow inner space or recess 107 inside.

Next, a small part of the top layer is cut 108 where the flexible antenna 109 with the embedded chip and the capacitor is pushed inside the hollow inner space or recess 107 replacing the wire antenna 103 as shown in FIG. 4, after pushing the one end of the flexible antenna 109 through the circumference of the first part of the ring and through the hollow inner space or recess 107 from one side of the cut 104 it emerges from the opposing side of the cut 104 and two ends of the flexible antenna 109 are then soldered in order to create the circular connection of the antenna 109 as shown in FIG. 5.

After embedding the flexible antenna 109, the hollow inner space or recess 107 is filled with glue or any liquid resin from inside with pressure to protect the electronic electronics of the flexible antenna 109, making it resistant to pressure and to protect from liquid penetrations into the hollow inner space or recess 107 now filled with flexible antenna 109.

The small portion of the top layer 106, defining an outer side of the ring 100 which was cut 108 is later covered with stone or any non-conductive material 101 as shown in FIGS. 1 and 2.

Figure 6:
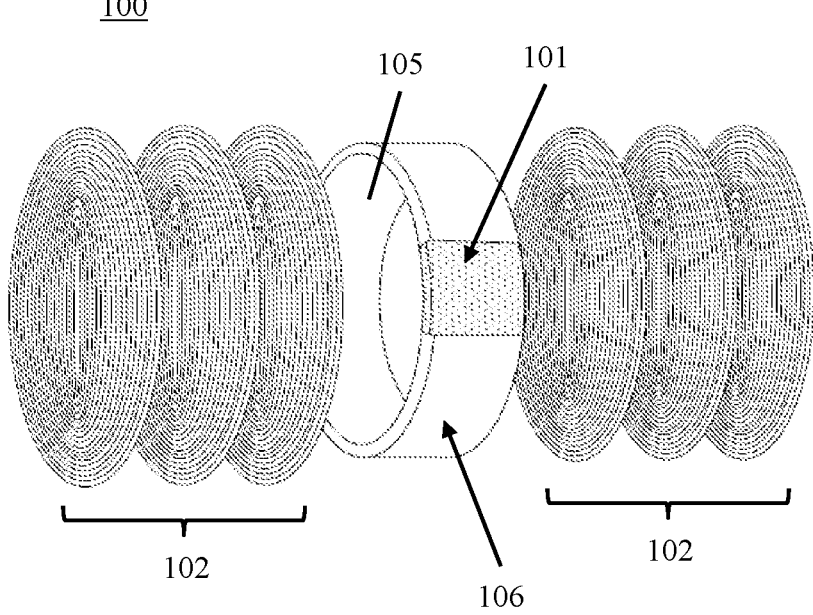
FIG. 6 illustrates how the signal is transmitted from the ring.

FIG. 6 illustrates how the signal 102 is transmitted from the ring 100. As shown, the signal 102 is spread from both sides of the metal ring 100.

Beside the passive NFC devices, active NFC devices also exist which have their own power source, such as batteries. Examples of active NFC devices include mobile phones and smart watches. Conversely, the ring 100 taught by the present invention operates specifically using passive NFC.

FIG. 7 illustrates how the present invention works in practice where a user is tapping their finger(s) and not the ring 100 as the signal is transmitted from the circle of the ring 100 to the POS device 111.

The reading distance of the ring 100 taught and claimed by the present invention, in this specific passive NFC embodiment, is up to 5 cm as determined by research and development testing. The NFC chip receives energy from the reader or POS device 111, for example from a POS device 111 when making payment or from a mobile phone when writing data in the NFC chip using the mobile device. Besides the NFC chip and the copper wire antenna 103, the device is further comprised of one or more capacitors for tuning the antenna 103 and for achieving the best reading performance when transmitting, receiving, and/or exchanging data between the NFC chip and a receiver, transmitter, or transceiver.

Figure 8:
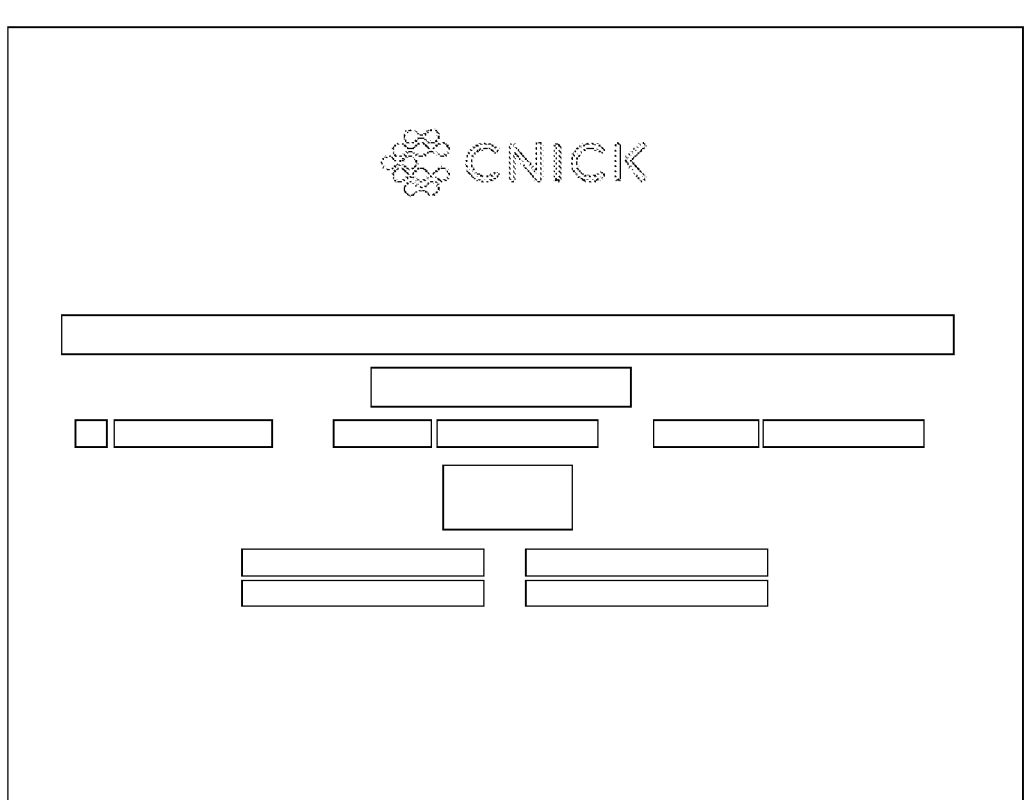
FIG. 8 is a screenshot illustrating the software taught by the present invention that calculates required capacitance of the capacitor for each size of the ring.

FIG. 8 is a screenshot illustrating the software GUI 112 taught by the present invention that calculates required capacitance of the capacitor for each size of the ring 100. The software calculates the minimum and maximum frequency range of the antenna 103 and capacitance of the capacitor for each size of ring 100, as this varies based on ring size.

It is appreciated that the optimum dimensional relationships for the parts of the invention, to include variation in size, materials, shape, form, function, and manner of operation, assembly, and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A process of manufacture of a wearable device using near field communications (NFC) to store, receive, and transmit information, comprising the steps of:
    creating a first bottom/base layer part of a wearable device defining the inner external surface and creating an inner space or channel;
    covering the inner space or channel of the first bottom/base layer part of the wearable device with a top layer created from a metal sheet formed to match the shape of the inner space or channel of the first bottom/base layer part;
    the first bottom/base layer part and top layer are soldered together; and
    a top layer is soldered to the edges of the first bottom/base layer part of the wearable device in order to create/keep a hollow space inside between the first bottom/base layer part and the top layer.

2. The process of claim 1, further comprising the steps of:
    cutting a small part of either the top layer or first bottom/base layer part open exposing the inner space or channel;
    inserting a flexible antenna with an embedded chip and a capacitor into the inner space or channel; and
    after inserting one end of the antenna through the circumference of the first part of the ring and through the inner space or channel from one side of the cut it emerges from the opposing side of the cut and two ends of the flexible antenna are then soldered in order to create the circular connection of the antenna.

3. The process of claim 2, further comprising the step of:
    after embedding the flexible antenna, filling the hollow inner space or channel with glue or liquid resin from inside with pressure.

4. The process of claim 3, further comprising the step of:

covering with any non-conductive material the small portion of the top layer, defining an outer side of the wearable device.

5. The process of claim 4, wherein the wearable device is a ring.

* * * * *